(12) United States Patent
Mallinson

(10) Patent No.: US 11,099,645 B2
(45) Date of Patent: *Aug. 24, 2021

(54) APPARATUS AND METHOD FOR DYNAMIC GRAPHICS RENDERING BASED ON SACCADE DETECTION

(71) Applicant: Sony Interactive Entertainment Inc., Tokyo (JP)

(72) Inventor: Dominic Saul Mallinson, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,365

(22) Filed: Mar. 3, 2020

(65) Prior Publication Data

US 2020/0201432 A1  Jun. 25, 2020

Related U.S. Application Data

(63) Continuation of application No. 15/853,529, filed on Dec. 22, 2017, now Pat. No. 10,585,475, which is a
(Continued)

(51) Int. Cl.
*G06F 3/01* (2006.01)
*G06F 1/3231* (2019.01)
*H04N 21/2343* (2011.01)

(52) U.S. Cl.
CPC ............ *G06F 3/013* (2013.01); *G06F 1/3231* (2013.01); *G06F 3/011* (2013.01); *G06F 3/015* (2013.01);
(Continued)

(58) Field of Classification Search
CPC ... G06F 3/013; G06F 3/012; G02B 2027/014; G02B 27/0093; G02B 27/017;
(Continued)

(56) References Cited

U.S. PATENT DOCUMENTS 7,783,061 B2  8/2010  Zalewski
7,809,145 B2  10/2010  Mao
(Continued)

FOREIGN PATENT DOCUMENTS

CN  101599127  12/2009
CN  102073377  5/2011
(Continued)

OTHER PUBLICATIONS

Patent Cooperation Treaty; "International Search Report" issued in corresponding PCT Application No. PCT/US16/48736, dated Oct. 28, 2016, 2 pages.
(Continued)

*Primary Examiner* — Koosha Sharifi-Tafreshi
(74) *Attorney, Agent, or Firm* — Fitch, Even, Tabin & Flannery LLP

(57) ABSTRACT

A method for rendering computer graphics based on saccade detection is provided. One embodiment of the method includes rendering a computer simulated scene for display to a user, detecting an onset of a saccade that causes saccadic masking in an eye movement of the user viewing the computer simulated scene, and reducing a computing resource used for rendering frames of the computer simulated scene during at least a portion of a duration of the saccade. Systems perform similar steps, and non-transitory computer readable storage mediums each storing one or more computer programs are also provided.

29 Claims, 4 Drawing Sheets

Related U.S. Application Data continuation of application No. 14/845,862, filed on Sep. 4, 2015, now Pat. No. 9,857,871.

(52) U.S. Cl.
CPC ..... *H04N 21/234345* (2013.01); *Y02D 10/00* (2018.01)

(58) Field of Classification Search
CPC .... G02B 2027/0138; G02B 2027/0178; G02B 27/0172; G02B 2027/0147; A61B 3/113; G09G 2340/0407; H04N 13/0484
See application file for complete search history.

(56) References Cited

U.S. PATENT DOCUMENTS

| | | | |
|---|---|---|---|
| 8,437,513 B1 | 5/2013 | Derakhshani | |
| 8,786,698 B2 | 7/2014 | Chen | |
| 8,793,620 B2 | 7/2014 | Stafford | |
| 8,824,779 B1* | 9/2014 | Smyth | G06T 7/593 |
| | | | 382/154 |
| 8,854,298 B2 | 10/2014 | Osman | |
| 8,907,891 B2 | 12/2014 | Zhu | |
| 9,030,425 B2 | 5/2015 | Stafford | |
| 9,044,675 B2 | 6/2015 | Stafford | |
| 9,084,938 B2 | 7/2015 | Osman | |
| 9,183,683 B2 | 11/2015 | Osman | |
| 9,665,171 B1 | 5/2017 | Skogo | |
| 9,857,871 B2 | 1/2018 | Mallinson | |
| 9,922,253 B2 | 3/2018 | Asbun | |
| 10,169,846 B2 | 1/2019 | Stafford | |
| 10,192,528 B2 | 1/2019 | Young | |
| 10,372,205 B2 | 8/2019 | Young | |
| 10,401,952 B2 | 9/2019 | Young | |
| 10,585,475 B2 | 3/2020 | Mallinson | |
| 2003/0038818 A1 | 2/2003 | Tidwell | |
| 2003/0194142 A1 | 10/2003 | Kortum | |
| 2004/0207632 A1 | 10/2004 | Miller | |
| 2004/0267954 A1 | 12/2004 | Shen | |
| 2006/0239471 A1 | 10/2006 | Mao | |
| 2007/0156391 A1 | 7/2007 | Guenthner | |
| 2007/0171367 A1 | 7/2007 | Sebastian | |
| 2007/0198982 A1 | 8/2007 | Bolan | |
| 2007/0271560 A1 | 11/2007 | Wahlert | |
| 2008/0188777 A1* | 8/2008 | Bedziouk | A61B 5/163 |
| | | | 600/595 |
| 2009/0141895 A1 | 6/2009 | Anderson | |
| 2009/0289895 A1 | 11/2009 | Nakada | |
| 2010/0056274 A1* | 3/2010 | Uusitalo | G02B 27/017 |
| | | | 463/31 |
| 2010/0204608 A1 | 8/2010 | Sugio | |
| 2011/0085700 A1 | 4/2011 | Lee | |
| 2011/0298829 A1 | 12/2011 | Stafford | |
| 2012/0033673 A1 | 2/2012 | Goel | |
| 2012/0052954 A1 | 3/2012 | Zhu | |
| 2012/0068913 A1 | 3/2012 | Bar-Zeev | |
| 2012/0075062 A1 | 3/2012 | Osman | |
| 2012/0086630 A1 | 4/2012 | Zhu | |
| 2012/0086631 A1 | 4/2012 | Osman | |
| 2012/0122592 A1 | 5/2012 | Stafford | |
| 2012/0154277 A1 | 6/2012 | Bar-Zeev | |
| 2012/0187312 A1 | 7/2012 | Guez | |
| 2012/0235064 A1 | 9/2012 | Guez | |
| 2012/0272179 A1 | 10/2012 | Stafford | |
| 2012/0276998 A1 | 11/2012 | Zhu | |
| 2012/0300061 A1 | 11/2012 | Osman | |
| 2013/0050432 A1 | 2/2013 | Perez | |
| 2013/0127980 A1 | 5/2013 | Haddick | |
| 2013/0135196 A1 | 5/2013 | Park | |
| 2013/0257751 A1 | 10/2013 | Stafford | |
| 2013/0279724 A1 | 10/2013 | Stafford | |
| 2013/0301727 A1 | 11/2013 | Huang | |
| 2014/0007097 A1 | 1/2014 | Chin | |
| 2014/0013437 A1 | 1/2014 | Anderson | |
| 2014/0043227 A1 | 2/2014 | Skogoe | |
| 2014/0092006 A1 | 4/2014 | Boelter | |
| 2014/0247277 A1 | 9/2014 | Guenter | |
| 2014/0292665 A1 | 10/2014 | Lathrop | |
| 2014/0300538 A1 | 10/2014 | Rijnders | |
| 2014/0310256 A1 | 10/2014 | Olsson | |
| 2014/0313120 A1 | 10/2014 | Kamhi | |
| 2014/0333535 A1 | 11/2014 | Stafford | |
| 2014/0354539 A1 | 12/2014 | Skogö | |
| 2014/0361971 A1* | 12/2014 | Sala | G06F 3/041 |
| | | | 345/156 |
| 2014/0361976 A1 | 12/2014 | Osman | |
| 2014/0361977 A1 | 12/2014 | Stafford | |
| 2014/0362110 A1 | 12/2014 | Stafford | |
| 2015/0015486 A1 | 1/2015 | Osman | |
| 2015/0085097 A1 | 3/2015 | Larsen | |
| 2015/0085250 A1 | 3/2015 | Larsen | |
| 2015/0085251 A1 | 3/2015 | Larsen | |
| 2015/0094142 A1 | 4/2015 | Stafford | |
| 2015/0169053 A1 | 6/2015 | Bozarth | |
| 2015/0192776 A1 | 7/2015 | Lee | |
| 2015/0213634 A1 | 7/2015 | Karmarkar | |
| 2015/0227789 A1 | 8/2015 | Watanabe | |
| 2015/0241967 A1 | 8/2015 | Saripalle | |
| 2015/0254905 A1 | 9/2015 | Ramsby | |
| 2015/0258431 A1 | 9/2015 | Stafford | |
| 2015/0258432 A1 | 9/2015 | Stafford | |
| 2015/0287167 A1 | 10/2015 | Cerny | |
| 2015/0287230 A1 | 10/2015 | Cerny | |
| 2015/0324568 A1 | 11/2015 | Publicover | |
| 2015/0338915 A1* | 11/2015 | Publicover | G06F 3/0482 |
| | | | 345/633 |
| 2016/0025971 A1 | 1/2016 | Crow | |
| 2016/0054837 A1 | 2/2016 | Stafford | |
| 2016/0085302 A1* | 3/2016 | Publicover | G02B 27/0172 |
| | | | 345/633 |
| 2016/0091720 A1 | 3/2016 | Stafford | |
| 2016/0093105 A1 | 3/2016 | Rimon | |
| 2016/0116745 A1 | 4/2016 | Osterhout | |
| 2016/0210173 A1 | 7/2016 | Bookman | |
| 2016/0212538 A1 | 7/2016 | Fullam | |
| 2016/0235323 A1 | 8/2016 | Tadi | |
| 2016/0246652 A1 | 8/2016 | Herdrich | |
| 2016/0283455 A1 | 9/2016 | Mardanbegi | |
| 2016/0307297 A1 | 10/2016 | Akenine-Moller | |
| 2017/0068312 A1 | 3/2017 | Mallinson | |
| 2017/0123487 A1 | 5/2017 | Hazra | |
| 2017/0123489 A1 | 5/2017 | Guenter | |
| 2017/0124760 A1 | 5/2017 | Murakawa | |
| 2017/0200252 A1 | 7/2017 | Nguyen | |
| 2017/0200308 A1 | 7/2017 | Nguyen | |
| 2017/0285735 A1 | 10/2017 | Young | |
| 2017/0285736 A1 | 10/2017 | Young | |
| 2017/0287112 A1 | 10/2017 | Stafford | |
| 2017/0287446 A1 | 10/2017 | Young | |
| 2018/0136722 A1 | 5/2018 | Mallinson | |
| 2019/0156794 A1 | 5/2019 | Young | |
| 2019/0346922 A1 | 11/2019 | Young | |
| 2019/0361526 A1 | 11/2019 | Young | |
| 2019/0384381 A1 | 12/2019 | Stafford | |

FOREIGN PATENT DOCUMENTS

| | | |
|---|---|---|
| JP | 08022385 | 1/1996 |
| JP | H099253 | 1/1997 |
| JP | 2005020729 | 1/2005 |
| JP | 2010257224 | 11/2010 |
| JP | 2014516595 | 7/2014 |
| JP | 2015520581 | 7/2015 |
| JP | 2015152938 | 8/2015 |
| JP | 2017526078 | 9/2017 |
| WO | 2009142008 | 11/2009 |

OTHER PUBLICATIONS

Patent Cooperation Treaty; "Notification of Transmittal of the International Search Report and the Written Opinion of the Inter-

(56) References Cited

OTHER PUBLICATIONS national Searching Authority, or the Declaration" issued in corresponding PCT Applictation No. PCT/US16/48736, dated Oct. 28, 2016, 2 pages.
Patent Cooperation Treaty; "Written Opinion of the International Searching Authority" issued in corresponding PCT Application No. PCT/US16/48736, dated Oct. 28, 2016, 8 pages.
USPTO; Office Action issued in U.S. Appl. No. 14/845,862, dated Apr. 20, 2017, 29 pages.
USPTO; Notice of Allowance issued in U.S. Appl. No. 14/845,862, dated Aug. 25, 2017, 9 pages.
Wikipedia; "Optical flow", https://en.wikipedia.org/wiki/Optical_flow_sensor, printed on Feb. 26, 2016, pp. 1-4.
Wikipedia; "Saccade", https://en.wikipedia.org/wiki/Saccades, printed on Feb. 26, 2016, pp. 1-5.
Triesch, Jochen, et al.;"Saccade contingent updating in virtual reality." Proceedings of the symposium on Eye tracking research & applications—ETRA '02 (2002): n. pag. Web., p. 1-8.
Han, Peng, et al; "Trajectory prediction of saccadic eye movements using a compressed exponential model." Journal of Vision 13.8 (2013): 27. Web., p. 1-13.
Bahill, A. Terry, et al.; "Predicting Final Eye Position Halfway Through a Saccade." IEEE Transactions on Biomedical Engineering BME-30.12 (1983): 781-86. Web., p. 1-6.
Pagel, Max; "Trajectory-based prediction of saccade landing Points", Bachelorarbeit am Institut fuer Neuro- und Bioinformatik Technisch Naturwissenschaftliche Fakultaet Universitaet zu Luebeck (2007), p. 1-37.
Bohme, Martin, et al; "Eye Movement Predictions Enhanced Bysaccade Detection" Brain Inspired Cognitive Systems: Aug. 29-Sep. 1, 2004. Web., p. 1-7.
Wikipedia; "Eye tracking", https://en.wikipedia.org/wiki/Eye_tracking, printed on Feb. 26, 2016, pp. 1-8.
European Patent Office; "Extended European Search Report" issued in App. No. 16842653.4, dated Jan. 8, 2019, 8 pages.
Chinese Patent Office; The First Office Action issued in Chinese Patent Application No. 201680050876.4, dated Dec. 13, 2018, 20 pages (includes English translation).
Japanese Patent Office; Non-Final Notification of Reasons for Refusal issued in Japanese Patent Application No. 2018-511414, dated May 21, 2019, 7 pages (includes English translation).
Japanese Patent Office; Decision to Grant a Patent issued in Japanese Patent Application No. 2018-511414, dated Jul. 30, 2019, 3 pages.
Chinese Patent Office; Rejection Decision issued in Chinese Patent Application No. 201680050876.4, dated Jul. 31, 2019, 14 pages (includes English translation).
Non-Final Office Action for U.S. Appl. No. 15/086,645, dated Oct. 11, 2017.
Non-Final Office Action for U.S. Appl. No. 15/086,953, dated Oct. 19, 2017.
Non-Final Office Action for U.S. Appl. No. 15/087,471, dated Oct. 10, 2017.
"3D Face Pose Estimation and Tracking from a Monocular Camera" by Qiang Ji and Rong Hu in Image and Vision Computing, vol. 20, Issue 7, Feb. 20, 2002, pp. 499-511.
"An Algorithm for Real-time Stereo Vision Implementation of Head Pose and Gaze Direction Measurement", by Yoshio Matsumoto and Alexander Zelinsky in FG '00 Proceedings of the Fourth IEEE International Conference on Automatic Face and Gesture Recognition, 2000, pp. 499-505.
"Facial feature extraction and pose determination", by Athanasios Nikolaidis, Pattern Recognition, vol. 33 (Jul. 7, 2000) pp. 1783-1791.
"Head Pose Estimation in Computer Vision: A Survey" by Erik Murphy, in IEEE Transactions on Pattern Analysis and Machine Intelligence, vol. 31, No. 4, Apr. 2009, pp. 607-626.
Co-Pending U.S. Appl. No. 14/246,062, to Mark Evan Cerny, filed Apr. 5, 2015.
Co-Pending U.S. Appl. No. 14/246,066, to Mark Evan Cerny, filed Apr. 5, 2014.
Co-Pending U.S. Appl. No. 14/927,157, to Jun Murakawa et al., filed Oct. 29, 2015.
Co-Pending U.S. Appl. No. 15/087,471 to Andrew Young and Jeffrey Stafford, filed Mar. 31, 2016.
Lossy Compression.(Mar. 25, 2016). Retrieved from https://en.wikipedia.org/w/index.php?title=Lossy_compression&oldid=711892088.
Non-Final Office Action for U.S. Appl. No. 15/087,629, dated Nov. 15, 2017.
Non-Final Office Action for U.S. Appl. No. 15/087,629, dated Feb. 23, 2017.
Co-Pending U.S. Appl. No. 15/087,629 to Andrew Young and Jeffrey Stafford, filed Mar. 31, 2016.
Co-Pending U.S. Appl. No. 15/086,645, to Andrew Young and Jeffrey Stafford, filed Mar. 31, 2016.
Co-Pending U.S. Appl. No. 15/086,953, to Andrew Young and Jeffrey Stafford, filed Mar. 31, 2016.
Final Office Action for U.S. Appl. No. 15/087,629, dated Apr. 5, 2018.
Notice of Allowance for U.S. Appl. No. 15/086,645, dated Mar. 13, 2018.
Advisory Action for U.S. Appl. No. 15/086,953, dated Jun. 14, 2018.
Final Office Action for U.S. Appl. No. 15/086,953, dated Mar. 15, 2018.
Final Office Action for U.S. Appl. No. 15/087,471, dated May 1, 2018.
Final Office Action for U.S. Appl. No. 15/087,629, dated Jul. 27, 2017.
USPTO; Advisory Action issued in U.S. Appl. No. 15/087,629, dated Jun. 28, 2018, 3 pages.
USPTO; Applicant-Initiated Interview Summary issued in U.S. Appl. No. 15/087,629, dated Jun. 29, 2018, 3 pages.
USPTO; Notice of Allowance and Fee(s) Due issued in U.S. Appl. No. 15/087,629, dated Aug. 15, 2018, 16 pages.
USPTO; Notice of Allowance and Fee(s) Due issued in U.S. Appl. No. 15/087,629, dated Nov. 21, 2018, 2 pages.
USPTO; Advisory Action issued in U.S. Appl. No. 15/087,471, dated Jul. 19, 2018, 3 pages.
USPTO; Non-Final Office Action issued in U.S. Appl. No. 15/087,471, dated Dec. 31, 2018, 25 pages.
USPTO; Non-Final Office Action issued in U.S. Appl. No. 15/086,953, dated Aug. 29, 2018, 64 pages.
USPTO; Final Office Action issued in U.S. Appl. No. 15/086,953, dated Jan. 4, 2019, 14 pages.
USPTO; Notice of Allowance and Fee(s) Due issued in U.S. Appl. No. 15/086,645, dated Sep. 28, 2018, 5 pages.
USPTO; Notice of Allowance and Fee(s) Due issued in U.S. Appl. No. 15/086,953, dated Mar. 20, 2019, 10 pages.
USPTO; Notice of Allowance and Fee(s) Due issued in U.S. Appl. No. 15/087,471, dated Apr. 17, 2019, 9 pages.
Patent Cooperation Treaty; "International Preliminary Report on Patentability" issued in PCT Application No. PCT/US2016/048736, dated Mar. 6, 2018, 6 pages.
Co-Pending U.S. Appl. No. 16/235,727, Jeffrey Roger Stafford et al., filed Dec. 28, 2018.
Co-Pending U.S. Appl. No. 16/533,659, Andrew Young et al., filed Aug. 6, 2019.
Co-Pending U.S. Appl. No. 16/523,791, Andrew Young et al., filed Jul. 26, 2019.
Pending U.S. Appl. No. 12/889,347 to Ruxin Chen and Steven Osman, filed Sep. 23, 2010.
USPTO; Non-Final Office Action for U.S. Appl. No. 15/853,529, dated Dec. 11, 2018, 29 pages.
USPTO; Notice of Allowance and Fee(s) Due issued in U.S. Appl. No. 15/853,529, dated Apr. 2, 2019, 6 pages.
USPTO; Notice of Allowance and Fee(s) Due issued in U.S. Appl. No. 15/853,529, dated Jul. 15, 2019, 6 pages.
USPTO; Notice of Allowance and Fee(s) Due issued in U.S. Appl. No. 15/853,529, dated Oct. 28, 2019, 6 pages.

(56) References Cited

OTHER PUBLICATIONS

USPTO; Non-Final Office Action issued in U.S. Appl. No. 16/235,727, dated Oct. 3, 2019, 19 pages.
USPTO; Non-Final Office Action issued in U.S. Appl. No. 16/533,659, dated Oct. 18, 2019, 24 pages.
USPTO; Non-Final Office Action issued in U.S. Appl. No. 16/523,791, dated Sep. 19, 2019, 71 pages.
Chinese Patent Office; Notification of the Decision to Grant a Patent issued in Chinese Patent Application No. 201680050876.4, dated Dec. 19, 2019, 5 pages (includes English translation).
Japanese Patent Office; "Notification of Reason(s) for Refusal" issued in Japanese Patent Application No. 2019-151193; dated Jul. 21, 2020; 11 pages (includes English translation).
Japanese Patent Office; "Decision of Refusal" issued in Japanese Patent Application No. 2019-151193; dated Dec. 8, 2020; 10 pages (includes English translation).
Kawakami, Hayato et al.; "Line-of-Sight Detection Camera with Saccade Tracking Capability and Its Applications for Interaction"; Information Processing Society of Japan Interaction 2014; URL:http://www.interaction-ipsj.org/proceedings/2014/data/20140220/14INT007.pdf; Feb. 28, 2014; 25 pages (includes English translation).
Sato, Kafuji; "VR HMD 'FOVE' from Japan will revolutionize the industry!? Eye tracking & adaptive rendering potential"; Kafuji Sato's VR Gaming Today!; https://game.watch.impress.co.jp/docs/series/vrgaming/703521.html; May 25, 2015; 23 pages (includes English translation).
Vue 11 Infinite; "Rendering"; http://www.vue-cg.jp/product/professional/vue_11_infinite/1107.html; Jun. 21, 2013, 15 pages (includes English translation).
European Patent Office; "Communication under Rule 71(3) EPC Intention to Grant" issued in European Patent Application No. 16842653.4, dated Mar. 4, 2021, 31 pages.

* cited by examiner

APPARATUS AND METHOD FOR DYNAMIC GRAPHICS RENDERING BASED ON SACCADE DETECTION

CROSS-REFERENCE TO RELATED APPLICATIONS

This application is a continuation of U.S. patent application Ser. No. 15/853,529, filed on Dec. 22, 2017, entitled "APPARATUS AND METHOD FOR DYNAMIC GRAPHICS RENDERING BASED ON SACCADE DETECTION," which is a continuation of U.S. patent application Ser. No. 14/845,862, filed on Sep. 4, 2015, entitled "APPARATUS AND METHOD FOR DYNAMIC GRAPHICS RENDERING BASED ON SACCADE DETECTION," the entire contents and disclosures of which are both hereby fully incorporated by reference herein in their entireties.

BACKGROUND OF THE INVENTION

1. Field of the Invention

The present invention relates generally to computer generated images, and more specifically to real-time rendering of computer generated graphics.

2. Discussion of the Related Art

Computer rendered graphics are used to present various user interfaces and media to users. Real-time rendering of computer graphics allows the graphical content to be rendered in response to user inputs and software state changes in real-time.

SUMMARY OF THE INVENTION

One embodiment provides a method comprising: rendering a computer simulated scene for display to a user, detecting an onset of a saccade that causes saccadic masking in an eye movement of the user viewing the computer simulated scene, and reducing a computing resource used for rendering frames of the computer simulated scene during at least a portion of a duration of the saccade.

Another embodiment provides a system comprising: an eye movement sensor, a display device for displaying computer simulated scenes to a user, and a processor communicatively coupled to the eye movement sensor and the display device. The processor being configured to render a computer simulated scene for display on the display device, detect an onset of a saccade that causes saccadic masking in an eye movement of the user viewing the computer simulated scene based on signals from the eye movement sensor, and reduce a computing resource used for rendering frames of the computer simulated scene during at least a portion of a duration of the saccade.

Another embodiment provides a non-transitory computer readable storage medium storing one or more computer programs configured to cause a processor based system to execute steps comprising: rendering a computer simulated scene for display to a user, detecting an onset of a saccade that causes saccadic masking in an eye movement of the user viewing the computer simulated scene, and reducing a computing resource used for rendering frames of the computer simulated scene during at least a portion of a duration of the saccade.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Figure 1:
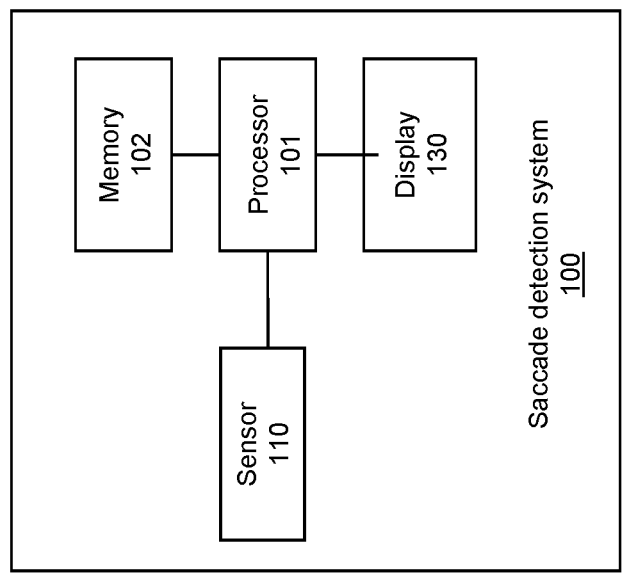
FIG. 1 is a block diagram illustrating a system for dynamic graphics rendering based on saccade detection in accordance with some embodiments of the present invention.

The human visual system has an eye motion called a saccade that is a rapid movement from one gaze position to another. During a saccade, the brain masks the signals that it receives from the optic nerve. This masking effect is generally referred to as saccadic masking. As soon as the saccade is over and the eyes have reached a stable new fixation point, the image that is sent via the optic nerve to the brain is then used to "fill in" the perceptual gap during the saccade. Other perceptual effects such as spatial updating and trans-saccadic integration also affect how the human brain perceive images around a saccade event. Spatial updating refers to the effect that a visual stimulus viewed prior to a saccade is still perceived by the brain during and after a saccade even when the visual stimulus is no longer visible. Tran-saccadic integration refers to the effect that the brain integrates visual information from two or more fixation points around saccades.

The saccade masking time can sometimes begin before the saccadic eye motion by some number of milliseconds (such as approximately 30 ms). The eye movement itself can last approximately 50-75 ms depending upon the magnitude of the saccade. After the eye motion stops, another approximately 30 ms of brain signal masking may occur.

In computer rendered virtual reality (VR) scenes, real-time image rendering takes a lot of central processing unit (CPU) and graphic processing unit (GPU) power and images are generated frequently (generally at least 60 Hz) to give a good VR perception. Therefore, rendering for VR can be very power consuming.

During a saccade, new images (frames) may not be perceived by a user due to saccadic masking. A saccadic masking period may easily be around 100 ms to 200 ms in some cases. A system that knows that a saccade masking period is occurring can avoid rendering frames of images to save computing resources and power consumption. For example, at 60 Hz rendering and a saccadic period of 100 ms, approximately 6 frames can be skipped or rendered with less computing resources during the saccade. In many VR systems, higher frame rates such as 90 Hz or 120 Hz are used. In such systems, more frames could be saved during a typical saccadic period. The total power saving of applying this technique may be related to the percentage of total VR viewing time that is taken by saccadic masking periods.

In addition to power saving, in some embodiments, the "saved" processing time may be used to render low frequency updates such as complex lighting calculations. Typically, scene lighting in 3D is relatively slow changing and so can be calculated with greater tolerance for latency. Since saccades are not guaranteed to occur at any specific rate, this technique is suited for long duration (several seconds) calculations where there is a statistical likelihood of getting a saccade. This technique may be used in conjunction with foveal rendering and gaze tracking.

Various techniques for detecting saccades will be discussed below. For example, saccades can be detected optically using a high rate sensor such as a position sensitive detector (PSD) or a Doppler Effect sensor. In some embodiments, the onset of a saccade may be detected by measuring electromyography (EMG) muscles signals on the skin close to the eye muscles.

A more detailed description will now be provided. Referring first to FIG. 1, there is shown a system for rendering images based on saccade detection that may be used to run, implement and/or execute any of the methods and techniques shown and described herein in accordance with some embodiments of the present invention. The saccade detection system 100 includes a processor 101, a memory 102, a display 130, and a sensor 110. The saccade detection system 100 may comprise, or be included with, one or more of a head mounted display ("HMD") device, an augmented reality device, a virtual reality device, a wearable device, a portable user device, a smartphone, a personal computer, a television, a tablet computer, a game console, etc. Generally, the saccade detection system 100 may comprise any processor-based device having at least one sensor.

The memory 102 may include one or more of a volatile and/or non-volatile computer readable memory devices. In some embodiments, the memory 102 stores computer executable code that causes the processor 101 to automatically detect an onset of a saccade and reduce the computing resource used for rendering frames of a computer simulated scene during at least a portion of a duration of the saccade. The computer readable instructions may instruct the processor to detect a saccade based on information from the sensor 110. The memory 102 may further store an eye movement model used to determine whether the detected eye movement constitutes a saccade that causes saccadic masking and/or to predict a duration of the detected saccade. The eye movement model may include parameters calibrated for individual users through one or more of the calibration processes described herein. In some embodiments, the memory 102 further stores computer executable code that causes the processor 101 to provide interactive audio and video content to the user. For example, the interactive video content may be virtual reality or augmented reality content. Video content may comprise computer generated images rendered in real-time. In some embodiments, computer executable code causes the processor 101 to perform one or more steps described herein with reference to FIGS. 2 and 4 below. In some embodiments, the memory 102 may be at least partially implemented by one or more of a local, remote, and cloud-based storage.

The sensor 110 may be or comprise one or more of a camera, an optical sensor, an infrared sensor, an EMG sensor, an optical reflector sensor, a range sensor, an optical flow sensor, a Doppler sensor, a microphone and the like. Generally, the sensor 110 is configured to detect a rapid eye movement such as a change in eye movement direction, acceleration, and speed. Eye movement may be tracked based on a series of detected eye gaze positions relative to the frame of the captured image and/or the head of the user. For example, the sensor 110 may capture a series of images of the pupil of an eye, and each a gaze location may be determined based on the location of the center of the pupil within the captured frame.

An EMG sensor is a sensor that detects the electrical potential generated by muscle cells. An EMG placed on or in proximity of the orbital or periorbital region of an eye can measure the amplitude and/or direction of eye movement based on electrical potential generated by muscles that control eye movement (e.g. the lateral rectus, the medial rectus, the inferior rectus, the superior rectus, the inferior oblique muscles, etc.). In some embodiments, the EMG sensor may be placed directly on the skin of the user over the muscle that the sensor is configured to measure. In some embodiments, the EMG sensor does not contact the skin of the user. In some embodiments, an EMG may detect an onset of a saccade based on muscle signals prior to the start of saccadic movement of the eye.

An optical reflector sensor may be a sensor that detects eye movement by detecting changes in light reflected off of the eyeball. For example, an optical reflector sensor may work in a similar manner as an optical track ball device. A range sensor may be any sensor configured to detect the presence of nearby objects without physical contact, such as a Doppler sensor, a passive optical sensor, an infrared sensor, a radar, and the like. Since a human eyeball is not perfectly spherical, the proximity between a sensor at a fixed distance from the skull of a user and the portion of the eyeball in the sensor's direct line-of-sight changes with eye movement. For example, the cornea of an eye is raised relative to the sclera, therefore, a shorter detected range may indicate that the cornea is in the sensor's direct line-of-sight. A microphone may be used to detect audio signals produced by eye movement. For example, amplitude of the sound produced by an eye movement may correspond to the amplitude of the eye movement. Directional eye movement may also be detected based on their respective sound profile.

The display 130 may be or comprise one or more of a display screen, a projection device, an augmented reality display device, a virtual reality display device, a HMD, and the like. Generally, the display 130 is configured to show computer generated graphics from the processor 101 to a user. While the display 130 is shown to be part of the saccade detection system 100, in some embodiments, the display 130 may be separately implemented from the saccade detection system 100. For example, the processor may output the generated graphics to an external display device to display to a user. The 0saccade detection system 100 may monitor a user's eye movement as the user views the computer generated graphics shown by the display 130 and/or real-world scenes.

In some embodiments, the saccade detection system 100 further includes a graphic processing unit (GPU) that may be integrated with or discrete from the processor 101. The GPU may perform at least some of the rendering calculations in generating graphics to display to a user. Generally, computing resources may refer to either or both of CPU and GPU processing resources.

In some embodiments, the saccade detection system 100 further includes a physical structure that holds, supports, and/or mounts the sensor 110 in a position suitable for sensing the user's eye movement. For example, in some embodiments, the physical structure may hold a camera slightly in front the user's eye or an EMG sensor directly on or in close proximity of the outer corner of the user's eye. Examples of such physical structures according to some embodiments are provided in FIGS. 5A-5B below. In some embodiments, only one eye is monitored, while in other embodiments, the system monitors both eyes with sets of sensors. In some embodiments, one or more of the sensors comprise multiple sensor and/or sensor types.

In some embodiments, the user's eye gaze may be tracked by the sensor 110 or a second sensor (not shown). For example, the system may use the sensor 110 to track the user's eye gaze positions as an input to a VR or AR system and also use the eye tracking data for saccade detection. In some embodiments, the user's eye gaze may be tracked by a camera and/or an EMG sensor, and the saccade detection is based on only the EMG sensor or another sensor not used for gaze tracking. The system may further include a sensor for detecting the end of a saccade. By way of example, the sensor for detecting the end of the saccade may be or comprise sensor 110, a sensor used for tracking eye gaze, and/or a separate sensor.

In some embodiments, the saccade detection system 100 may include other input/output devices such as speakers, audio output ports, keys, touch pads, touch screens, microphones, gyroscopes, wireless transceivers, and the like. In some embodiments, one or more methods and functions described herein may be performed by a remote device and communicated to the saccade detection system 100 via a wired or wireless data connection. In some embodiments, the processor 101 is configured to use the tracked eye movement and data received from a remote source to determine the content to display to the user on the display 130. For example, the processor 101 may cause the display 130 to display local or external content in an augmented reality or virtual reality manner based on the user's tracked eye movement. The processor 101 may further determine whether and how to reduce the computing resources used for rendering frames of the content based on detected saccades.

In some embodiments, each component shown in FIG. 1 is enclosed and/or affixed to a portable housing such as a head mounted device (HMD) or a wearable device. In some embodiments, one or more components shown in FIG. 1 may be separately implemented and communicate with the system through a wired or wireless connection. For example, the sensor 110 may be a sensor placed near a computer monitor or television set, and the memory 102 and the processor 101 shown in FIG. 1 may be implemented with a personal computer system, a game console, or an entertainment system.

Figure 2:
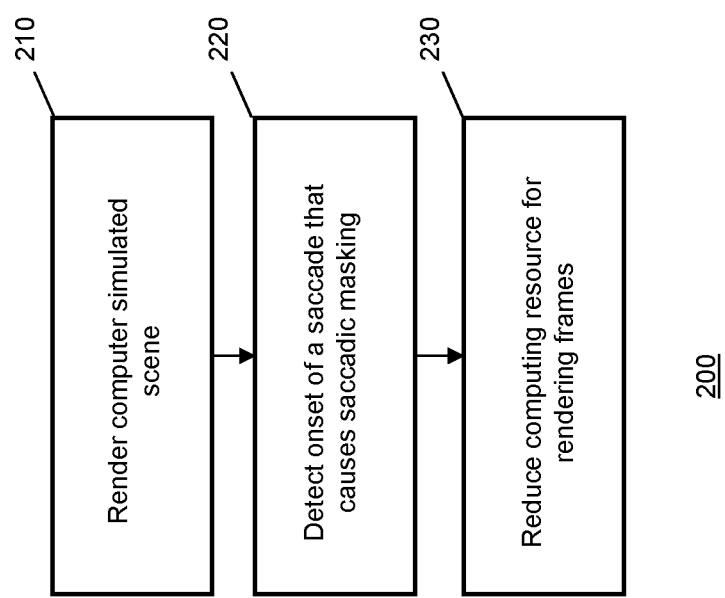
FIG. 2 is a flow diagram illustrating a method for dynamic graphics rendering based on saccade detection in accordance with some embodiments of the present invention.

Referring to FIG. 2, there is illustrated an example of a method 200 for rendering images based on saccade detection. In some embodiments, steps of method 200 may be performed by one or more server devices, user devices, or a combination of server and user devices. Generally, the steps of method 200 may be performed by one or more processor-based devices such the processor 101 of the saccade detection system 100 and/or other control circuits.

In step 210, the system renders a computer simulated scene for display to a user. In some embodiments, the computer simulated scene is rendered in real-time based on user inputs and/or program states. In some embodiments, the computer simulated scene is rendered at a constant frame rate such as 60 Hz, 90 Hz, 120 Hz, etc. In some embodiments, the computer simulated scene is rendered at a variable frame rate. The computer simulated scene may comprise one or more of a VR scene, an AR scene, a 3D scene, a 2D scene, and the like. The rendering of the computer simulated scene may include the rendering of 2D objects, 3D objects, backgrounds, shadows, lighting effects, user interface elements, and the like. In some embodiments, the computer simulated scene may be part of an interactive movie, a video game, a simulator software, and the like.

In step 220, the system detects an onset of saccade that causes saccadic masking. A saccade generally refers to a quick movement of eyes between two phases of fixation. A saccade is distinguished from other types of eye movement such as ocular tremor, ocular drift, and smooth pursuit. A saccade of sufficient magnitude causes saccadic masking in brain perception. The system may distinguish a saccade that causes saccadic masking from microsaccades, which are small involuntary eye movement. A saccade may be detected by detecting a sudden change in one or more of direction, speed, and acceleration of eye movement. In some embodiments, an EMG sensor may be used to monitor for muscle signals associated with an onset of a saccade. For example, a saccade may be detected by detecting a spike in the electrical potential generated by one or more muscles that control eye movement. In some embodiments, a saccade is detected when an acceleration of eye movement that exceeds a predetermined threshold is detected. In some embodiments, the detection of saccade may be based on an eye movement model. For example, a the threshold of eye movement acceleration used for detecting saccade may be based on a user's demographic or may be calibrated for the individual user using one or more calibration methods described herein. Generally, any known method of saccade detection may be used without departing from the spirit of the present disclosure.

In some embodiments, a duration of the saccade is predicted after step 220. In some embodiments, the duration of the saccade may be predicted based on at least one of an eye movement model and a magnitude of a measurement used to detect the onset of the saccade. The eye movement model may be based on statistical data relating to durations of saccades in human eyes and/or be calibrated for the individual user. Statistical data relating to durations of saccades in human eyes may be based on a survey of the general population that provides information on the typical saccade durations of most people. In some embodiments, the duration of the saccade is predicted based on the magnitude of the saccade at the onset. The duration of a saccade may generally correlate to the magnitude of eye movement acceleration at the onset. Therefore, the system may measure the data relating to the acceleration at the onset to predict the duration of the saccade. In some embodiments, an EMG sensor measures electrical potential generated by muscles that control eye movement and the prediction of the duration of the saccade is based on the value of the measured electrical potential. In some embodiments, the speed of eye movement may be calculated from at least two images captured by an image sensor to detect a saccade. The duration of the saccade may be predicted based on the speed of eye movement shortly after the onset of a saccade. In some embodiments, the system monitors for a peak eye movement speed and/or eye movement deceleration during a saccade and predicts the end of the saccade based on the detected peak eye movement speed and/or eye movement deceleration.

In step 230, the system reduces computing resource used for rendering frames of the computer simulated scene during at least a portion of a duration of the saccade. In some embodiments, the system may reduce the computing resource used for rendering frames by skipping one or more frames of the computer simulated scene, repeating one or more frames of the computer simulated scene, reducing a rendering detail of one or more frames of the computer simulated scene, reducing a rendering resolution of one or more frames of the computer simulated scene, and/or adjusting a variable frame rate for rendering the computer simulated scene. In some embodiments, the system repeats the frame generated just before the reduction period to avoid performing calculations for the frames during the reduction period. In a system with variable frame rate rendering, such as a system with a variable frame rate GPU, the system may pause rendering until the end of the saccadic masking period or render at a lower frame rate during the reduction period. In some embodiments, the system reduces the rendering details by reducing the details in the texture map, reducing the polygon count of the 3D models, and reducing lighting effects such as shadows, reflections, and subsurface scattering. In some embodiments, the frames in the reduction period may be generated with a technique similar to the reprojection technique in group of pictures (GOP) video encoding. With bidirectional projection, a B frame references images preceding and following that frame, and contains motion-compensated difference information relative to the referenced frames.

Generally, during the reduction period, the system renders the computer simulated scene in a way that requires fewer calculations by the CPU and/or the GPU of the system. Due to saccadic masking, spatial updating, and/or trans-saccadic perception, frames, and/or elements and details of a frame may be omitted without being perceptible to a viewer.

In some embodiments, the reduction of computing resources used for rendering frames lasts for at least a portion of the predicted duration of a saccade. For example, with a 60 Hz rendering, if a saccade is predicted to last 100 ms, the reduction may last 1-6 frames. In some embodiments, the system may be configured to leave a "safe" zone at the beginning and/or the end of a detected saccade period in which the frames are rendered as normal. In some embodiments, the system may take in to effect that saccadic masking may persist for some time after the end of saccadic movement of the eye and allow the reduction period to exceed the expected duration of saccadic eye movement. In some embodiments, the system does not predict the duration of the saccade and the reduction period may be set to a default minimum length for all detected saccades. For example, if only saccades having an onset magnitude that typically corresponds to at least 100 ms of duration are detected in step 220, the reduction period may be set to 90 ms for all detected saccades without the system predicting a duration for each detected saccade.

In some embodiments, in step 220, the system also determines a confidence level of the detection of the onset of the saccade. The confidence level may be based on the clarity of the measured signal and/or the magnitude of the change in one or more of eye movement direction, acceleration, and speed. In some embodiments, the system determines the amount of computing resources to reduce based on the confidence level. The amount of computing resources to reduce may be based on how many frames to skip, how many frames to repeat, how much rendering detail to omit, the rendering resolution, the rendering frame rate, etc. For example, with a high confidence level, the rendering resolution may be dropped to a fourth of the original rendering resolution; while with a low confidence level, the rendering resolution may be dropped to half of the original rendering resolution. In some embodiments, the system selects from two or more methods of reducing the computing resources for rendering frames of the computer simulated scene based on the confidence level. For example, with a high confidence level, the system may skip or repeat frames; while with a low confidence level, the system may reduce the detail of the rendered frame.

In some embodiments, the amount and the method of reduction may correspond to the temporal location of a frame within a saccade period. For example, less reduction may be made to frames nearer to the beginning and the end of a saccade period as compared to frames in the middle of a saccade period.

In some embodiments, the system is further configured to reallocate the computing resources saved in step 230 to perform low frequency update calculations for rendering the computer simulated scene. For example, the system may reallocate the computing resource to perform complex lighting calculations for the computer simulated scene. In some embodiments, the freed computing resource may be used by other application and system processes.

Since each individual's physiology varies, in some embodiments, prior to the process shown in FIG. 2, the system may lead a user through a calibration sequence to generate or configure an eye movement model individualized for the user. For example, the system may instruct a user to move their eyes from one angular position to another. The system may then compare the measurements obtained by the sensor to the expected eye movement to configure the eye movement model for that user. The eye movement model may then be used to detect a saccade that causes saccadic masking and/or predict the duration of the saccade.

In some embodiments, in addition to or instead of performing a calibration sequence, after step 220, the system may detect an end of a saccade period for calibration purposes. The end of a saccade period may be detected by eye tracking methods and may correspond to a return to an eye movement speed or pattern corresponding to other types of eye motion states such as fixation, ocular tremor, ocular drift, microsaccade, and smooth pursuit. The end of a saccade period may be detected by the same or a different sensor used to detect the onset of the saccade in step 220. The measured duration of a saccade period may be compared to the predicted duration of the saccade to calibrate the eye movement model used to predict the duration of the saccade. A more detailed description of the calibration process is provided herein with reference to FIG. 4 below.

In some embodiments, the saccade detection in FIG. 2 may be used in conjunction with foveated rendering. Foveated rendering is a technique in which the image resolution or amount of detail varies across the image according to fixation points. When a saccade is detected, the system may assumed no fixation point during the duration of the saccade and reduce the image resolution or the amount of detail in the rendered image to a baseline value across the entire image.

Figure 3:
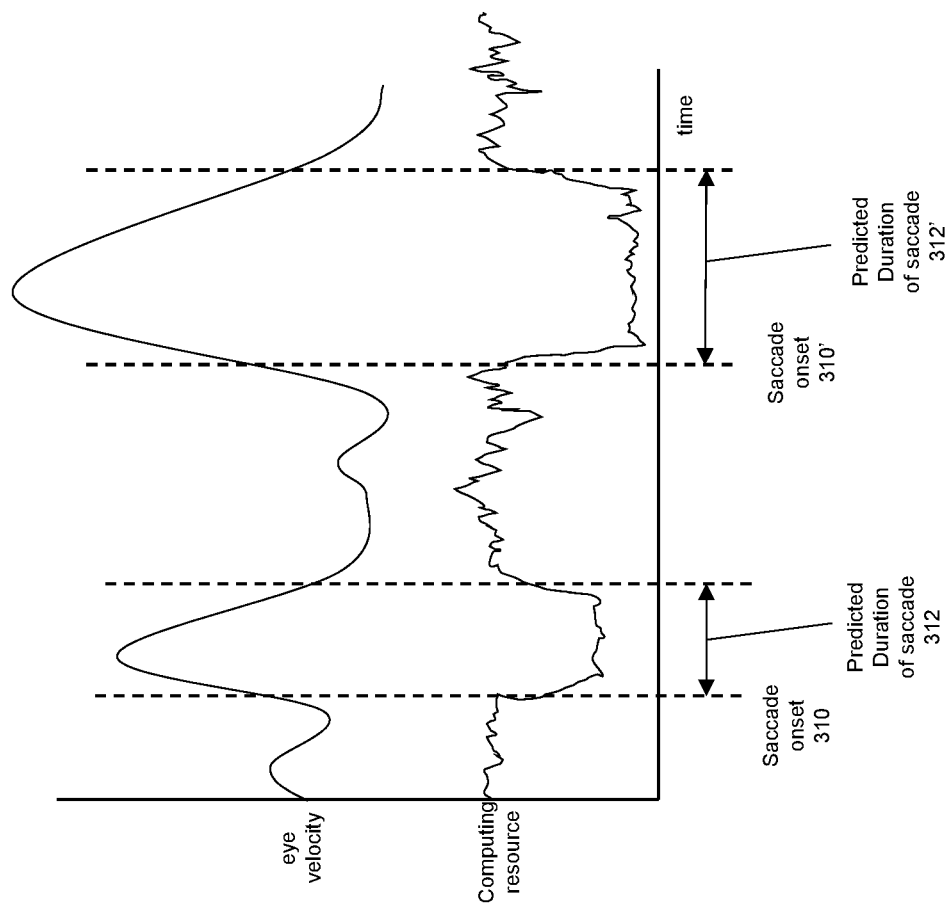
FIG. 3 is an illustration of computing resource reduction with saccade detection in accordance with some embodiments of the present invention.

Referring to FIG. 3, there is shown an illustration of reducing computing resource with saccade detection in accordance with some embodiments of the present invention. In FIG. 3, eye velocity or acceleration may be tracked by a sensor such as sensor 110 in FIG. 1. When eye velocity or acceleration exceeds a threshold, the system may detect a saccade onset 310. In some embodiments, the onset may be detected based on muscle signals prior to the increase of eye velocity or acceleration. In some embodiments, the onset of a saccade may be detected shortly after the actual beginning of the saccadic movement.

In some embodiments, the system also predicts a duration of the saccade 312 based on measurements at the onset of the saccade. In some embodiments, the prediction may be based on the magnitude of the acceleration at the saccade onset 310. When a saccade of a magnitude that causes saccadic masking is detected, the system may reduce the computing resource used for rendering frames by skipping one or more frames of the computer simulated scene, repeating one or more frames of the computer simulated scene, reducing a rendering detail of one or more frames of the computer simulated scene, reducing a rendering resolution of one or more frames of the computer simulated scene, and/or adjusting a variable frame rate for rendering the computer simulated scene. As shown in FIG. 3, the computing resource used for rendering frames of the computer simulated scene drops during a portion of the predicted duration of saccade. The computing resource line generally represent the load on the CPU and/or GPU for rendering the images. For example, the computing resource line may represent the number of calculations performed per millisecond by the CPU/GPU. The system returns the rendering method back to the normal baseline just prior to the predicted end of a saccade period. The predicted end of a saccade period may correspond to the predicted end of saccadic movement or the predicted end of the saccadic masking perceptual effect, which could last for some time after the end of the saccadic movement.

FIG. 3 is provided as illustrations of concepts only. FIG. 3 does not correspond to actual saccade detection or computing resource reduction and is not necessarily to scale.

The reduction in computing resources during saccade periods can reduce the overall power consumption of the rendering device. For portable devices using batteries, the reduction of power consumption can lead to increased battery life between charges. The computing resources may also be allocated for other uses such as high latency updates for rendering the computer simulated scenes. The computing resources may also be freed up for use by other application and/or the operating system processes running on the device.

Figure 4:
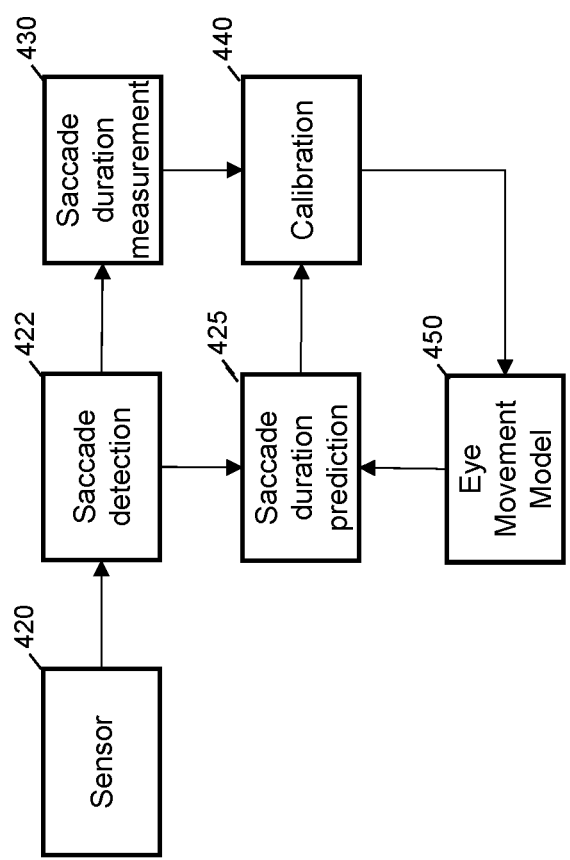
FIG. 4 is a block diagram illustrating a calibration process in accordance with some embodiments of the present invention.

Referring to FIG. 4, there is illustrated an example of a saccade duration prediction with feedback calibration. The sensor 420 is configured to measure one or more of eye movement direction, speed, and acceleration and provide the measurement to a saccade detection module 422. The sensor 420 may be the sensor 110 shown in FIG. 1 and/or may comprise one or more of a camera, an optical sensor, an optical image sensor, an infrared sensor, an optical flow sensor, an EMG sensor, a position sensing device, a Doppler effect sensor, and the like.

The saccade detection module 422 analyzes the data from the sensor 420 to determine whether a saccade that causes saccadic masking is occurring or is about to occur. In some embodiments, saccade detection module 422 may base its determination on the eye movement model 450 or a separate model. For example, an eye movement model may include an eye movement acceleration magnitude threshold indicative of an onset of a saccade that causes saccadic masking. For embodiments with an EMG sensor, the threshold may correspond to a muscle signal voltage.

After an onset of a saccade is detected, the saccade duration prediction module 425 predicts the duration of the saccade. In some embodiments, the saccade duration prediction module 425 bases its prediction on one or more of the magnitude of eye movement at the onset of the saccade and a detected peak acceleration or speed of the saccade. The saccade duration prediction module 425 further bases its prediction on an eye movement model 450. The eye movement model 450 may correspond detected saccade magnitudes to saccade durations. The eye movement model 450 may initially be based on statistical data relating to durations of saccades in human eyes and later be calibrated for the individual user.

Also after an onset of a saccade is detected, the saccade duration measurement module 430 monitors for the end of the saccade period and calculates the duration of the saccade. The end of the saccade period may be detected by eye tracking methods and may correspond to a return of eye movement speed or pattern corresponding to other types of eye motion states such as fixation, ocular tremor, ocular drift, microsaccade, and smooth pursuit. The end of a saccade period may be detected by the sensor 420 and/or one or more other sensors. The calibration module 440 compares the predicted saccade duration from the saccade duration prediction module 425 and the measured saccade duration from the saccade duration measurement module 430 to determine the accuracy of the prediction. The calibration module 440 may update the eye movement model 450 based on the comparison. For example, if the saccade duration prediction module 425 tends to underestimate the duration of a saccade, the calibration module 440 may update the eye movement model 450 to correspond measurements at the onset of a saccade with a longer saccade duration.

While the eye movement model 450 is shown to be used by the saccade duration prediction module 425 in FIG. 4, in some embodiments, the saccade detection module 422 also uses the same or a different eye movement model 450. In some embodiments, the calibration module 440 may base its calibration on multiple saccade duration predictions and saccade duration measurements, and only update the eye movement model 450 when a trend is observed.

Figure 5B:
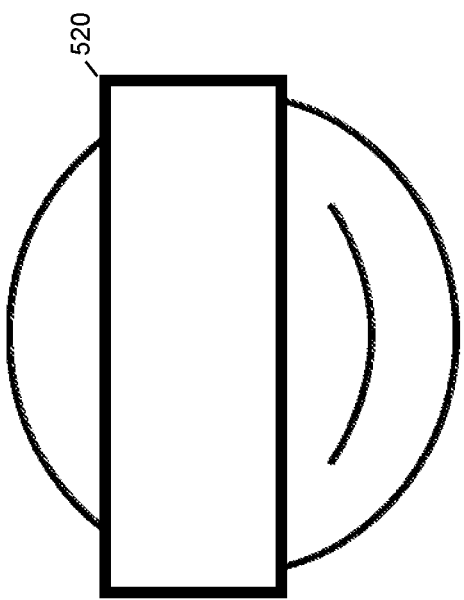
FIGS. 5A-5B are illustrations of head mounted devices in accordance with some embodiments of the present invention.
Figure 5A:
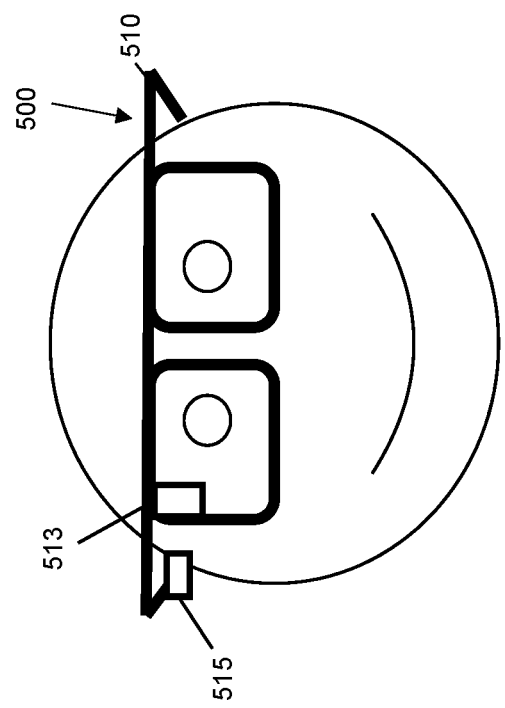

Referring to FIG. 5A, there is shown an illustration of an augmented reality type HMD with which the technique disclosed herein may be implemented. The HMD device 500 includes a frame 510 holding sensors 513 and 515 in positions suitable for monitoring a wearer's eye movement. While two sensors are shown in FIG. 5A, the techniques described herein may be implemented with HMDs having only the first sensor 513 or the second sensor 515.

In some embodiments, the HMD device 500 includes two sensors; one sensor is used to detect the onset of a saccade and another sensor is used to measurement the duration of a saccade. In some embodiments, one sensor is used to detect both the onset of the saccade and the end of the saccade. In some embodiments, the HMD does not include a sensor for detecting the end of a saccade. The HMD device 500 also includes a display device (not shown) that is configured to provide an augmented reality scene to the user. The first sensor 513 may be an optical sensor that is positioned to capture images of the user's eye. The second sensor 515 may be an EMG sensor that is either contacting or in close proximity of the temple region of the user as shown in FIG. 5A. An EMG sensor may be placed in other positions, for example, below the user's eye, near the inner corner of the eye, etc. In some embodiments, two or more EMG sensors may be placed in different areas. The second sensor 515 may comprise other types of sensors such as a low resolution image sensor, a high frame-rate image sensor, an optical reflector sensor, a range sensor, and a microphone. In embodiments in which the second sensor is an image or optical sensor, the second sensor 515 may be placed near the first sensor 513. The placement of sensors in FIG. 5A are provided as an example only. Generally, the placement of the sensors may be configured variously based on sensor type and the user's physiology without departing form the spirit of the present disclosure.

Referring to FIG. 5B, there is shown an illustration of a virtual reality type HMD device with which the technique disclosed herein may be implemented. The HMD device 520 encloses the field of vision of the user. Sensor(s) described herein may be placed on the user facing side of the HMD. For example, an image sensor may be positioned just above the display screen inside the HMD device 520 and an EMG sensor may be positioned on a portion of the HMD device 520 resting against the orbital or periorbital areas of the user.

In both FIGS. 5A-5B, detected saccades may be used by the HMD devices 500 and 520 to determine how to render computer generated graphics to display to the user. When a saccade is detected, the processor of the HMD devices 500 and 520 may reduce the computing resources used for rendering frames of the computer simulated scene. The determined and estimated gaze locations may also be used to predict a future gaze location which allows the computer to determine the fixation point of the user when the next frame is displayed to facilitate foveated rendering.

In some embodiments, one or more of the embodiments, methods, approaches, and/or techniques described above may be implemented in one or more computer programs or software applications executable by a processor based apparatus or system. By way of example, such processor based apparatuses or systems may comprise a computer, entertainment system, game console, workstation, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted or configured to cause a processor based apparatus or system to execute steps comprising: rendering a computer simulated scene for display to a user, detecting an onset of a saccade that causes saccadic masking in an eye movement of the user viewing the computer simulated scene, and reducing a computing resource used for rendering frames of the computer simulated scene during at least a portion of a duration of the saccade.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
   detecting a saccade in an eye of a user viewing a computer simulation;
   predicting, prior to an end of the saccade, where a fixation point of the user will be located in a computer simulated scene at the end of the saccade;
   determining a confidence level of the detection of the saccade; and
   rendering the predicted fixation point in a greater amount of detail than other portions of the computer simulated scene based on the confidence level.

2. The method of claim 1, wherein the rendering the predicted fixation point in a greater amount of detail than other portions of the computer simulated scene comprises:
   rendering the predicted fixation point at a higher resolution than other portions of the computer simulated scene.

3. The method of claim 1, wherein the predicting where a fixation point of the user will be located in a computer simulated scene at the end of the saccade comprises:
   predicting a future gaze location of the user.

4. The method of claim 1, wherein the predicting where a fixation point of the user will be located in a computer simulated scene at the end of the saccade comprises:
   predicting a duration of the saccade.

5. The method of claim 4, wherein the predicting the duration of the saccade is based on at least one of statistical data relating to durations of saccades in human eyes and a magnitude of a measurement used to detect the onset of the saccade.

6. The method of claim 4, further comprising:
   detecting the end of the saccade; and
   calculating the duration of the saccade based on at least the detected end of the saccade.

7. The method of claim 6, further comprising:
   comparing the calculated duration of the saccade to the predicted duration of the saccade; and
   using results of the comparison to adjust a model used to predict the duration of the saccade.

8. The method of claim 1, wherein the saccade is detected using one or more of an optical sensor, an optical flow sensor, an electromyography (EMG) sensor, a position sensing device, or a Doppler effect sensor.

9. The method of claim 1, wherein the detecting a saccade in an eye of a user viewing a computer simulation comprises:
   detecting an onset of the saccade prior to a start of saccadic movement of the eye.

10. The method of claim 1, further comprising:
    calibrating an individualized eye movement model for the user viewing the computer simulation, wherein the detecting the saccade is based on the individualized eye movement model.

11. The method of claim 1, further comprising:
    reducing a computing resource used for rendering frames of the computer simulation during at least a portion of a duration of the saccade.

12. The method of claim 11, further comprising:
determining an amount of the computing resource to reduce based on the confidence level.

13. The method of claim 11, further comprising:
selecting from two or more methods of reducing the computing resource used for rendering frames of the computer simulation based on the confidence level.

14. The method of claim 11, further comprising:
reallocating the computing resource to perform low frequency update calculations for rendering frames of the computer simulation.

15. The method of claim 14, wherein the low frequency update calculations comprise lighting calculations.

16. A system comprising:
an eye movement sensor;
a display device for displaying computer simulated scenes to a user; and
a processor communicatively coupled to the eye movement sensor and the display device, the processor being configured to execute steps comprising:
detecting a saccade in an eye of the user viewing the computer simulated scenes;
predicting, prior to an end of the saccade, where a fixation point of the user will be located in a computer simulated scene at the end of the saccade;
determining a confidence level of the detection of the saccade; and
rendering the predicted fixation point in a greater amount of detail than other portions of the computer simulated scene based on the confidence level.

17. The system of claim 16, wherein the rendering the predicted fixation point in a greater amount of detail than other portions of the computer simulated scene comprises:
rendering the predicted fixation point at a higher resolution than other portions of the computer simulated scene.

18. The system of claim 16, wherein the predicting where a fixation point of the user will be located in a computer simulated scene at the end of the saccade comprises:
predicting a future gaze location of the user.

19. The system of claim 16, wherein the predicting where a fixation point of the user will be located in a computer simulated scene at the end of the saccade comprises:
predicting a duration of the saccade.

20. The system of claim 16, wherein the detecting a saccade in an eye of the user viewing the computer simulated scenes comprises:
detecting an onset of the saccade prior to a start of saccadic movement of the eye.

21. The system of claim 16, wherein the processor is further configured to execute steps comprising:
calibrating an individualized eye movement model for the user viewing the computer simulated scenes, wherein the detecting the saccade is based on the individualized eye movement model.

22. The system of claim 16, wherein the processor is further configured to execute steps comprising:
reducing a computing resource used for rendering frames of the computer simulated scenes during at least a portion of a duration of the saccade.

23. The system of claim 22, wherein the processor is further configured to execute steps comprising:
determining an amount of the computing resource to reduce based on the confidence level.

24. The system of claim 22, wherein the processor is further configured to execute steps comprising:
selecting from two or more methods of reducing the computing resource used for rendering frames of the computer simulated scenes based on the confidence level.

25. A non-transitory computer readable storage medium storing one or more programs that cause a processor based system to execute steps comprising:
detecting a saccade in an eye of a user viewing a computer simulation;
predicting, prior to an end of the saccade, where a fixation point of the user will be located in a computer simulated scene at the end of the saccade;
determining a confidence level of the detection of the saccade; and
rendering the predicted fixation point in a greater amount of detail than other portions of the computer simulated scene based on the confidence level.

26. The non-transitory computer readable storage medium of claim 25, wherein the rendering the predicted fixation point in a greater amount of detail than other portions of the computer simulated scene comprises:
rendering the predicted fixation point at a higher resolution than other portions of the computer simulated scene.

27. The non-transitory computer readable storage medium of claim 25, wherein the predicting where a fixation point of the user will be located in a computer simulated scene at the end of the saccade comprises:
predicting a future gaze location of the user.

28. The non-transitory computer readable storage medium of claim 25, wherein the predicting where a fixation point of the user will be located in a computer simulated scene at the end of the saccade comprises:
predicting a duration of the saccade.

29. The non-transitory computer readable storage medium of claim 25, wherein the detecting a saccade in an eye of a user viewing a computer simulation comprises:
detecting an onset of the saccade prior to a start of saccadic movement of the eye.

* * * * *